May 16, 1961  J. B. MURRAY ET AL  2,984,436
CONTROL MEANS FOR AIRFOILS
Filed May 13, 1958  2 Sheets-Sheet 1

INVENTORS
JOHN B. MURRAY
WILLIAM D. YARNALL
BY
*F. J. Schmitt*
*George J. Ruben*
ATTORNEYS

INVENTORS
JOHN B. MURRAY
WILLIAM D. YARNALL

United States Patent Office 2,984,436
Patented May 16, 1961

2,984,436

CONTROL MEANS FOR AIRFOILS

John B. Murray, Arlington, and William D. Yarnall, Irving, Tex., assignors, by mesne assignments, to the United States of America as represented by the Secretary of the Navy Filed May 13, 1958, Ser. No. 735,077

5 Claims. (Cl. 244—85)

This invention relates to a power-driven actuating mechanism which is particularly adapted for use on aircraft in order to establish and maintain the position of an aileron or other flight-control member.

In aircraft operating at high speeds, the problem of finding space within the wings in which to locate flight-control apparatus is a serious one. Furthermore, it is of increasing concern, since progressively thinner wing sections and reduced wing areas limit the over-all dimensions of the apparatus which may be so located. The situation is made even more complex by the fact that the extreme air pressures developed at high speeds make obligatory the use of full-power controls, and dictate even heavier and more bulky structures for carrying out the control functions.

Aileron-operating mechanisms of the type under consideration frequently incorporate one or more rigidly-positioned hydraulic cylinders connected to a source of fluid under pressure, the fluid flow to such cylinders being controlled through a valve linkage leading to the pilot's compartment. Aileron position is thus determined solely by displacement of the cylinder piston relative to the wing structure or air frame. Such designs are effective in performing the desired control functions, but they have hitherto required somewhat complex assemblies for actuating the airfoil to the position selected and preventing its movement beyond such position. Customarily, a correlated relationship is established between the position of the pilot's control lever, on the one hand, and the aileron position, on the other. Variations in this relationship determine the passage of fluid into (or out of) the rigidly-positioned cylinder until the aileron angle is equal to the control lever displacement, at which point the fluid flow ceases.

The present invention operates upon a different principle. In accordance with a preferred embodiment thereof, a hydraulic cylinder has one of its ends connected to an aileron through a bell crank. The cylinder piston is also connected to the aileron through a second bell crank. The cylinder is free to move relative to the air frame, and is actuated by a flow of fluid under control of a valve mechanism having at least one component the position of which is a function of control-stick position. A principal characteristic of the invention is that this valve mechanism incorporates an automatic follow-up feature, whereby the cylinder, when itself actuated in response to a pilot-initiated displacement of the valve mechanism, moves in a direction which tends to effectively eliminate this displacement of the valve linkage from its neutral position relative to the cylinder. The cylinder movement is stopped when the latter reaches a position corresponding to that of the control stick, and such position is maintained until the pilot effects a further change in control stick orientation.

The improved results herein obtained are due in large measure to a mounting of the aileron cylinder so that it is in effect suspended between, and pivotally supported by, the two aileron bell cranks, and hence is free to undergo movement relative to the air frame itself. Since the pilot-controlled valve linkage also undergoes selected changes in position relative to the air frame, these two factors can be effectively correlated, thus eliminating the separate components required to maintain a selected aileron position in known designs where the hydraulic cylinder is rigidly secured to the air frame.

One object of the present invention, therefore, is to provide an improved form of actuating mechanism for the selective positioning of a flight-control surface such as an aircraft aileron.

Another object of the invention is to provide means for establishing the position of a flight-control surface so that it is correlated with the position of an attitude-control lever manipulated by the pilot of the aircraft, such positional correlation being brought about by the selective flow of fluid into and out of a hydraulic cylinder operatively connected to the control surface, whereby this fluid flow is terminated upon attainment of the desired control surface orientation through a movement of the hydraulic cylinder itself relative to the frame of the aircraft.

Other objects and many of the attendant advantages of this invention will be readily appreciated as the same becomes better understood by reference to the following detailed description when considered in connection with the accompanying drawings wherein.

Figure 3:
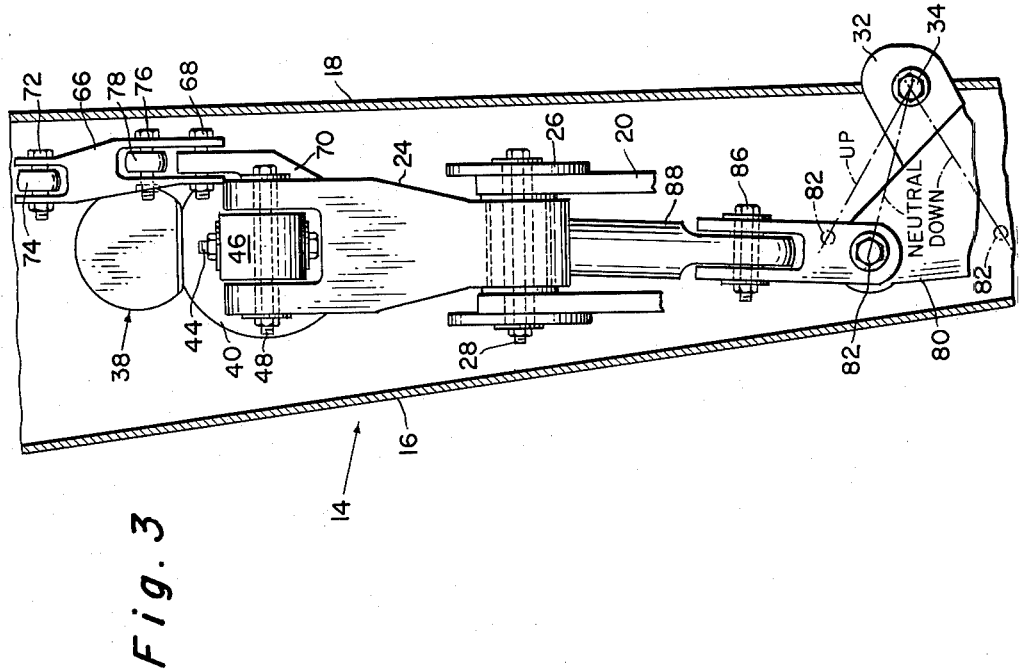
Fig. 3 is an end view of the aileron-control mechanism of Fig. 2.
Figure 1:
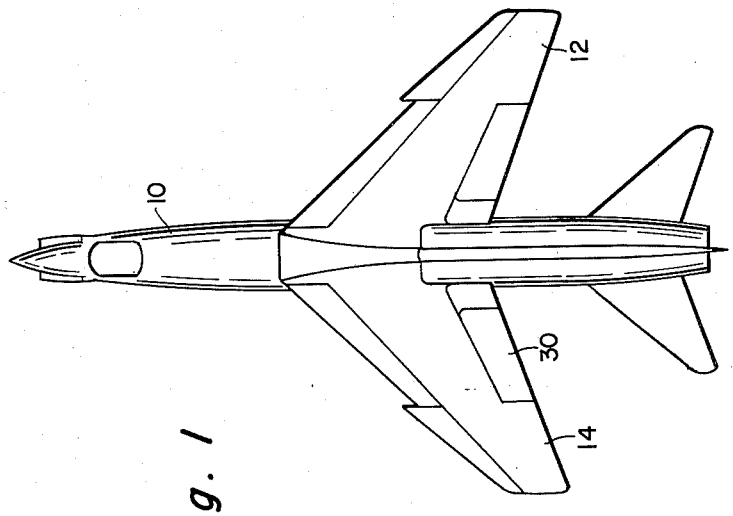
Fig. 1 is a plan view of one type of aircraft in which the improved airfoil-control mechanism of the present invention may be incorporated.
Figure 2:
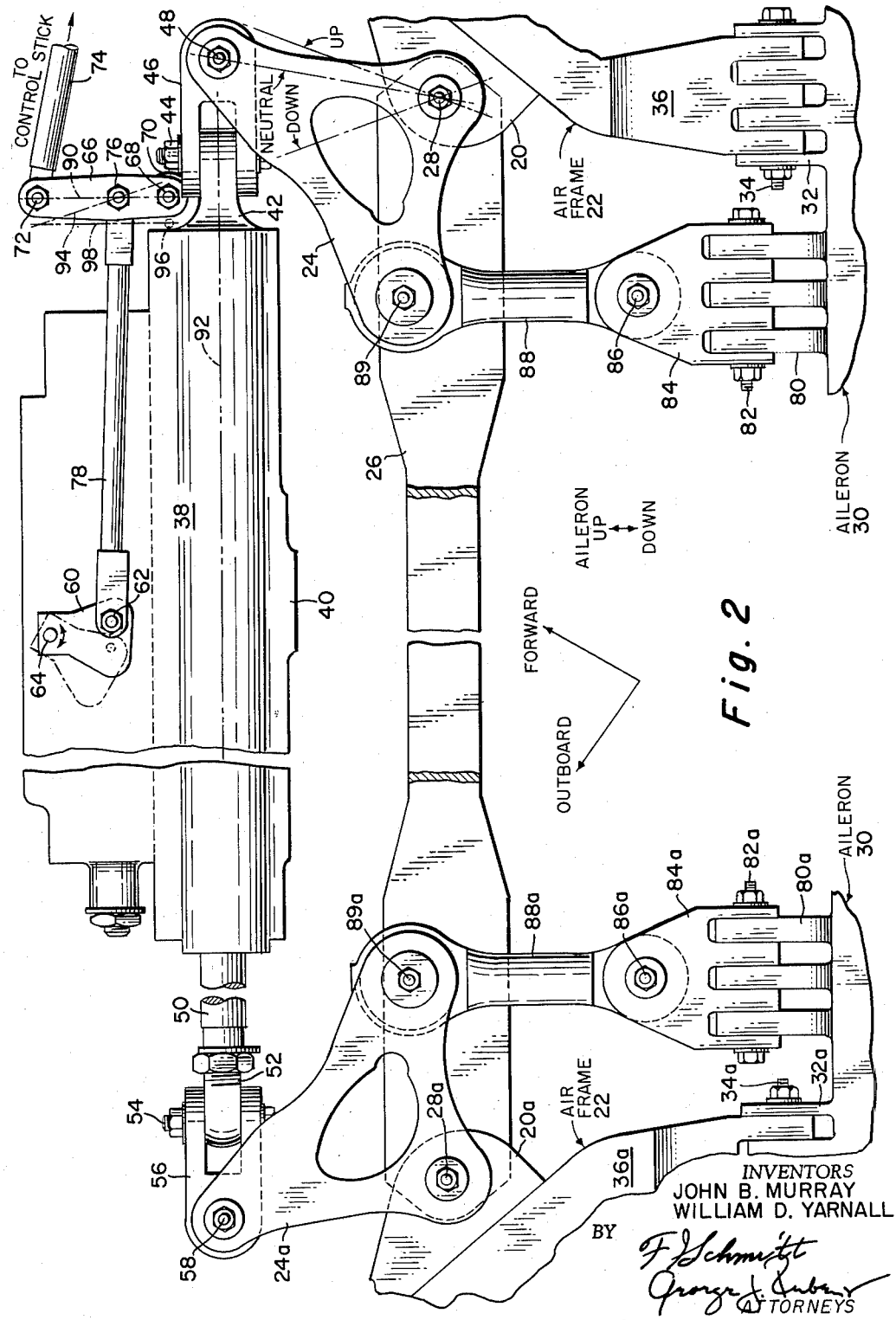
Fig. 2 is a top view of a preferred form of aileron-control mechanism designed in accordance with the principles invention.

Referring now to the drawing, there is illustrated in Fig. 1 an aircraft having a fuselage 10 and wings 12 and 14. The left-hand wing 14 of the aircraft includes a trailing-edge section upper skin 16 and a lower skin 18, as shown in Fig. 3. A bifurcate projection 20 is formed integral with the air frame 22 (see Fig. 2, which is a view looking downward into the interior of wing 14) and pivotally supports an inboard bell crank 24. A bifurcate strap 26, as well as the bell crank 24, are secured to the bifurcate projection 20 by means of a pin 28. Although a preferred embodiment of the invention is being described herein in connection with the left-hand wing 14 of the aircraft, it should be clearly understood that each aileron-control component has its counterpart in the right-hand wing 12, and that construction and operation of each assembly is, except for their opposite-handedness of installation and operation, identical.

Referring again to Fig. 2, an aileron 30 has an inboard hinge fitting 32 which is pivotally mounted by means of a hinge bolt 34 to an end of the wing trailing edge assembly rib 36, which extends aft from, and is rigidly secured to, a wing rear beam (not shown) of the air frame 22. The outboard portion of aileron 30 is provided with a second hinge fitting 32a which is the counterpart of fitting 32. It is pivotally mounted on the end of the wing trailing edge assembly rib 36a by a hinge bolt 34a.

An outboard bell crank 24a is secured to bifurcate projection 20a by a pin 28a for limited rotational movement about the pin as an axis. The strap 26 extends as illustrated between the pins 28 and 28a, its principal function being to reinforce the wing structure by bearing a portion of the load imposed on the wing by the aileron 30 through the bell cranks 24 and 24a. It will be seen that the two bell crank assemblies are substantially identical in construction, and that their operation is also similar except that a clockwise rotation of one member is accompanied by a counterclockwise rotation of the other, viewed as set forth in Fig. 2 of the drawings. This feature will be better understood as the description proceeds.

A hydraulic cylinder, generally indicated by the reference number 38, includes a barrel 40 the end fitting 42 of which is attached by a bolt 44 to an inboard forward trunnion 46, which in turn is pivotally secured by a pin 48 to the forward arm of the bell crank 24. The cylinder 38 has a piston rod 50, and on the outboard end of rod 50 is located an adapter 52 which is secured by a bolt 54 to an outboard forward trunnion 56. The latter is pivotally attached to the outboard bell crank 24a by the pin 58.

Pivotally mounted on the cylinder 38 is a hydraulic fluid flow control member 60. This member 60 is provided with a receiving stud 62 which is movable generally parallel to the axis of the cylinder 38, member 60 thus being rotatable about the shaft 64 within a range such as indicated by the broken line. Rotation of shaft 64 regulates the flow of fluid into and out of the cylinder 38 from a source (not shown) in a conventional manner, and hence further discussion of such a well-known feature will not be set forth herein.

For transmitting motion from the control stick in the pilot's compartment to the stud 62, there is provided an idler 66 which is pivotally mounted by a bolt 68 on a bracket 70 which in turn is rigidly carried on the cylinder barrel 40 near the inboard end of the latter. The idler 66 is pivotally connected by a bolt 72 to one section 74 of a linkage extending from the control stick in the pilot's compartment of the aircraft. The idler 66 is still further joined by a bolt 76 to the inboard end of a connecting rod 78 the outboard end of which is joined to the stud 62, as illustrated.

Rigidly attached to (or integral with) the respective aileron hinge fittings 32 and 32a are an inboard aileron horn 80 and an outboard aileron horn 80a. These horns 80 and 80a are pivotally attached by hinge bolts 82, 82a, respectively, to a pair of aft trunnions 84, 84a. The trunnions 84, 84a are further pivotally attached by bolts 86, 86a to the linking structures 88, 88a. Bolts 89, 89a pivotally secure these linking structures to their respective bell cranks 24, 24a. As will later become apparent, aileron 30 is hinged by bolts 34, 34a, 82 and 82a for limited angular rotation about a fixed axis defined by the bolts 34, 34a in order to effect an upward or downward positioning of the aileron.

Referring now to the showing of Fig. 3, it will be seen that the aileron hinge bolt 34 is located adjacent the lower skin 18 of wing 14, while the hinge bolt 82 attaching the aileron horn 80 to the trunnion 84 lies near the upper skin 16 of the wing. Consequently, a forward motion of the aileron horn 80 results in an upward deflection of the aileron, and correspondingly an aft motion of the aileron horn 80 results in a downward deflection of the aileron. The extent of angular movement of the bolt 82 from neutral position is indicated in Fig. 3 by the broken lines.

Referring again to Fig. 2, operation of the disclosed structure to result in a downward deflection of the aileron 30 will now be set forth. Assume such a movement of the pilot's control stick as to cause the connecting linkage, which includes the member 74, to move to the left. This motion will actuate the idler 66 to cause the connecting rod 78 to move the member 60 and hence rotate the shaft 64, the stud 62 moving in a generally outboard direction relative to the cylinder 38. The amplitude of this outboard motion of the stud 62 is a function of the change in angular relationship between the idler 66 and the cylinder. If the idler axis is represented by the broken line 90, then this axis is normal to the longitudinal axis 92 of the cylinder 38 when the elements are in neutral position, and under such conditions no fluid flows into or out of the cylinder.

With the assumed direction of control stick movement, the idler 66 is pivoted on its mounting bolt 68 until its axis assumes a position such as shown, for example, by the broken line 94, forming an acute angle with the cylinder axis 92. The fluid flow control member 60 responds to the outboard displacement of the stud 62 to the position shown in broken lines in the drawing by permitting hydraulic fluid to flow into the cylinder 38 in such a manner as to bring about a retraction of the piston rod 50 into the cylinder. Inasmuch as the outboard end of piston rod 50 is mounted on and supported by the bell crank 24a, and since the inboard end of cylinder 38 is supported by the bell crank 24, such a retraction of the piston rod results in a counterclockwise rotation about the pin 28 of the inboard bell crank 24 and an equal but clockwise rotation of the outboard bell crank 24a about the pin 28a. It will be recalled that the hydraulic cylinder 38 is freely supported between the two bell cranks 24 and 24a. Hence, any force imparted to one bell crank is accompanied by an equal and opposite force imparted to the remaining bell crank. Consequently, piston rod 50 is displaced in an inboard direction relative to the air frame 22, while the cylinder barrel 40 is displaced outwardly relative to the air frame.

Since the idler 66 is mounted on the bracket 70, and since the latter is in turn rigidly secured to the cylinder barrel 40, the lower end of the idler is also displaced in an outboard direction, causing the idler to pivot on the bolt 72. However, this bolt 72 is always stationary relative to the air frame 22 as long as the pilot's control stick is held motionless. When the barrel 40 has carried the idler mounting bolt 68 in an outboard direction as far as the location 96 (for example) the axis of the idler 66 can now be represented by the broken line 98. This axis 98 is parallel to the original axis 90 and normal to the cylinder axis 92. Hence, the stud 62 is now again neutrally positioned to terminate the fluid flow into the cylinder, and the piston rod 50 is hydraulically "locked" in its new retracted position. It should be obvious that the degree of such retraction is a direct function of the amplitude of control stick deflection.

It will now be appreciated that other orientations of the pilot's control lever will produce corresponding movements of the cylinder 38. For example, a further left-hand movement of the control rod 74 will cause further retraction of the piston rod 50, and a right-hand deflection of the control rod toward, to, or beyond its neutral position will effect a proportionate extension of the piston rod. In all cases, the control unit produces a hydraulically-actuated motion of the cylinder 38 in such a direction as to restore and maintain the right-angular relationship between the idler axis and the cylinder axis 92.

Summarizing the above operation, an extension of the piston rod 50 produces clockwise rotation of the inboard bell crank 24, counterclockwise rotation of the outboard bell crank 24a, forward motion of the links 88 and 88a, trunnions 84 and 84a and the aileron horns 80, 80a to result in an upward deflection of the aileron 30. In similar fashion, retraction of the piston rod 50 is accompanied by a downward deflection of the aileron.

It will be noted that the pins 48 and 58 are mounted essentially vertically. These pins, together with the pivoting bolts 89, 89a, 86 and 86a which interconnect the bell cranks 24, 24a, links 88, 88a, and the aft trunnions 84, 84a, are so designed as to allow a limited amount of displacement in a horizontal plane of the components relative to one another. In like manner, the design of hinge bolts 82 and 82a accommodates changes in angular relationship between the aileron 30 and the aft trunnions 84 and 84a when the position of the aileron is changed. Still further, bolts 44 and 54, which join the cylinder 38 to the forward trunnions 46 and 56, are intended to accommodate slight changes in the alignment of such trunnions and the cylinder which take place during extension and retraction of the piston rod 50. Although the bell crank mounting pins 28, 28a deviate slightly from the vertical as a result of deviations in aileron position, this causes only very slight displacements of the cylinder 38.

It should be noted that the bolts 44 and 54 are for the primary purpose of securing the cylinder 38 to the trunnions 46 and 56. However, these bolts 44 and 54 are so dimensioned as to allow for manufacturing and installation tolerances which may result in slight dissymmetries in position of the bell cranks 24 and 24a, respectively. For example, if the inboard bell crank 24 is slightly higher than the outboard bell crank 24a, both the forward trunnions 46 and 56 will normally lie level within the wing 14, although the inboard trunnion 46 will be slightly the higher to cause the cylinder 38 to be slightly displaced from a level position. Furthermore, the bolts 44 and 54 are configured to accommodate slight changes in the angular relationships between the trunnion axes and the cylinder axis as the cylinder is caused to move relative to the air frame.

Obviously many modifications and variations of the present invention are possible in the light of the above teachings. It is therefore to be understood that within the scope of the appended claims the invention may be practiced otherwise than as specifically described.

We claim:

1. Control means for an airfoil mounted for selective movement relative to the fixed wing structure of an aircraft, said control means comprising: a pair of bell cranks pivotally mounted in laterally-spaced relation on the said aircraft wing structure, each of said bell cranks being connected at corresponding points to said airfoil; a hydraulic cylinder having a piston the outer end of which is pivotally connected to one of said bell cranks, the end of said cylinder opposite to said piston being pivotally mounted on, and supported by, the remaining bell crank, both said cylinder and said piston thus having limited freedom of movement in an axial direction relative to said fixed wing structure; valve means mounted on said hydraulic cylinder and designed to regulate the flow of fluid into and out of the cylinder to thereby control the selective extension and retraction of said piston; and linkage means responsive to a signal initiated by the pilot of said aircraft for selectively actuating said valve means to thereby produce a movement of said piston relative to said cylinder and a movement of both said piston and said cylinder relative to the said aircraft wing structure, thus causing rotation of said bell cranks in opposite directions and a positioning of said airfoil in accordance with the extent of such rotation, said linkage means including at least one component which is displaced from a neutral position in response to said pilot-initiated signal, the displacement of said one component acting to initiate a movement of said hydraulic cylinder of such an extent, and in such a direction, as to overcome the displacement of said component and return the latter to its said neutral position.

2. Aileron control means according to claim 1, in which the component of said linkage means which is displaced from neutral position in response to said pilot-initiated signal is an idler bar one end of which is pivotally mounted on said hydraulic cylinder and having an axis which is normally perpendicular to the longitudinal axis of said hydraulic cylinder when said idler is in neutral position.

3. Aileron control means according to claim 2, in which one end of said idler bar is pivotally mounted on said cylinder, the other end of said idler bar is pivotally connected to said linkage means, and an intermediate point of said idler bar is pivotally connected to said valve means.

4. Control means for an airfoil mounted for selective movement relative to the fixed wing structure of an aircraft having a control stick, said control means comprising a pair of bell cranks pivotally mounted in laterally-spaced relation on the said aircraft wing structure, each of said bell cranks being connected at corresponding points to said airfoil, a hydraulic cylinder having a piston the outer end of which is pivotally connected to one of said bell cranks, the end of said cylinder opposite said piston being pivotally mounted on, and supported by, the remaining bell crank, both said piston and said cylinder thus having limited freedom of axial movement relative to said fixed wing structure, valve means mounted on said hydraulic cylinder intermediate its ends, said valve means being designed to regulate the flow of fluid into and out of the cylinder to thereby control the selective expansion and contraction of said piston, an idler bar pivotally mounted on that end of said cylinder opposite to said piston, said idler bar when in neutral position being positioned so that its axis is essentially perpendicular to the longitudinal axis of said cylinder, with the pivotal connection to said cylinder being at one end of said idler bar, a connection from the pilot-operated control stick of said aircraft to the remaining end of said idler bar, such that a selective movement of said control stick will cause the axis of said idler bar to form an acute angle with the longitudinal axis of said cylinder, and a connection between said valve means and an intermediate point on said idler bar, whereby, when the axis of said idler bar is caused to form an acute angle with the longitudinal axis of said cylinder, fluid flows in the latter to cause in turn a selective extension or retraction of said piston with consequent axial movement thereof relative to said aircraft wing structure, a rotation of both said bell cranks, and a change in the position of said airfoil.

5. The combination of claim 4, further including means responsive to selective extension and retraction of said piston in response to an actuation of said idler bar to a position in which its axis is other than normal to the longitudinal axis of said cylinder for producing a movement of said cylinder which in turn tends to reestablish a neutral position for said assembly in which the axis of said idler bar and the axis of said cylinder again assume their right-angular relationship.

References Cited in the file of this patent

UNITED STATES PATENTS

| | | |
|---|---|---|
| 2,395,671 | Kleinhans et al. | Feb. 26, 1946 |
| 2,612,329 | Crandall et al. | Sept. 30, 1952 |
| 2,678,177 | Chenery et al. | May 11, 1954 |
| 2,685,422 | Hammond et al. | Aug. 3, 1954 |